April 3, 1945.  C. N. KIMBERLIN, JR  2,373,031
PROCESS FOR ALKYLATING AROMATIC CONSTITUENTS
Filed July 12, 1941  2 Sheets—Sheet 1

Charles N. Kimberlin, Jr. Inventor
By P. L. Young Attorney

Patented Apr. 3, 1945

2,373,031

UNITED STATES PATENT OFFICE 2,373,031

PROCESS FOR ALKYLATING AROMATIC CONSTITUENTS

Charles N. Kimberlin, Jr., Baton Rouge, La., assignor to Standard Oil Development Company, a corporation of Delaware Application July 12, 1941, Serial No. 402,192

5 Claims. (Cl. 260—671)

The present invention is concerned with a process for continuously alkylating aromatic constituents. The invention is more particularly concerned with an improved process for the continuous production of mono-ethyl benzene. In accordance with the present invention mono-ethyl benzene is produced in a continuous operation employing a particular sequence and arrangement of reaction zones, settling zones, and distillation zones.

It it well known in the art to react aromatic and olefinic hydrocarbon constituents for the production of alkylated aromatic compounds. For example, it is known in the art to produce mono-ethyl benzene by reacting benzene and ethylene under suitable conditions and in the presence of a Friedel-Crafts type catalyst. These reactions are generally conducted at a temperature in the range from about 125° F. to about 250° F. Conventional operating temperatures are in the range from about 160° F. to about 200° F. The catalyst employed usually comprises a metallic halide such as aluminum chloride, zinc chloride, and iron chloride. However, in these reactions, particularly in operations conducted for the production of mono-ethyl benzene, it is relatively difficult to control the course of the reaction so that a relatively high yield of mono-ethyl benzene is secured rather than poly-ethyl benzenes and higher constituents. This is particularly the situation when continuous operations for the production of mono-ethyl benzene are employed. I have, however, now discovered a process by which mono-ethyl benzene may be readily produced in a continuous operation. In accordance with my process, the aromatic and olefinic constituents are passed into the bottom of a reaction zone containing a body of liquid catalyst. The reaction products overflow from this reaction zone into a settling zone wherein the catalyst is separated and returned to the reaction zone. The reaction product passes from the settling zone into subsequent distillation zones wherein the desired products are segregated.

Figure 1:
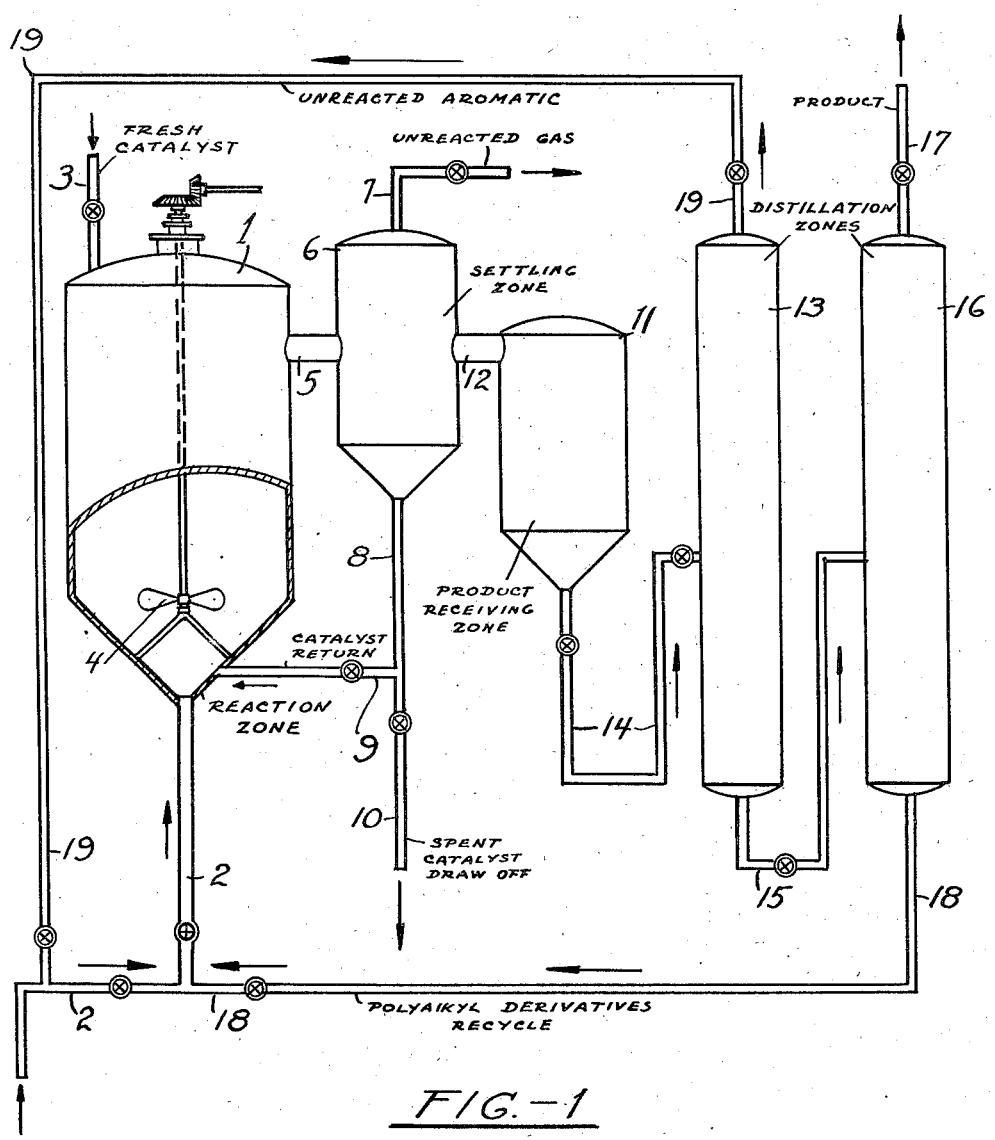

The process of my invention may be readily understood by reference to the attached drawings illustrating embodiments of the same. Figure 1 illustrates a single stage process while Figure 2 illustrates an operation employing a plurality of stages.

Referring specifically to Figure 1 the feed material comprising olefinic and aromatic constituents is introduced into reaction zone 1 by means of line 2. Fresh catalyst, which for the purpose of description is taken to be aluminum chloride, is introduced into reaction zone 1 by means of line 3. Intimate mixing between the catalyst and the feed constituents is secured by means of stirrer or equivalent means 4. Temperature and pressure conditions within reaction zone 1 are maintained to secure the maximum yield of the desired product. The reaction products together with the catalyst overflow by means of conduit 5 into settling zone 6. Unreacted gases are removed overhead from settling zone 6 by means of line 7 while the catalyst which separates is removed from the bottom of zone 6 by means of line 8. This catalyst may be recycled to zone 1 by means of line 9 or withdrawn from the system by means of line 10.

The reaction products are passed to product receiving zone 11 by means of line 12 and then introduced into distillation zone 13 by means of line 14. Temperature and pressure conditions in distillation zone 13 are adjusted to remove overhead by means of line 19 unreacted aromatic constituents which are preferably recycled to zone 1 with the fresh feed. The alkylated aromatics are withdrawn from zone 13 by means of line 15 and passed to distillation zone 16 wherein temperature and pressure conditions are adjusted to remove overhead by means of line 17 the desired product. The higher boiling constituents are removed as bottoms by means of line 18 and preferably recycled to zone 1. When the operation is conducted for the production of mono-ethyl benzene, the mono-ethyl benzene is removed by means of line 17 and any poly-ethyl benzenes formed by means of line 18.

Figure 2:
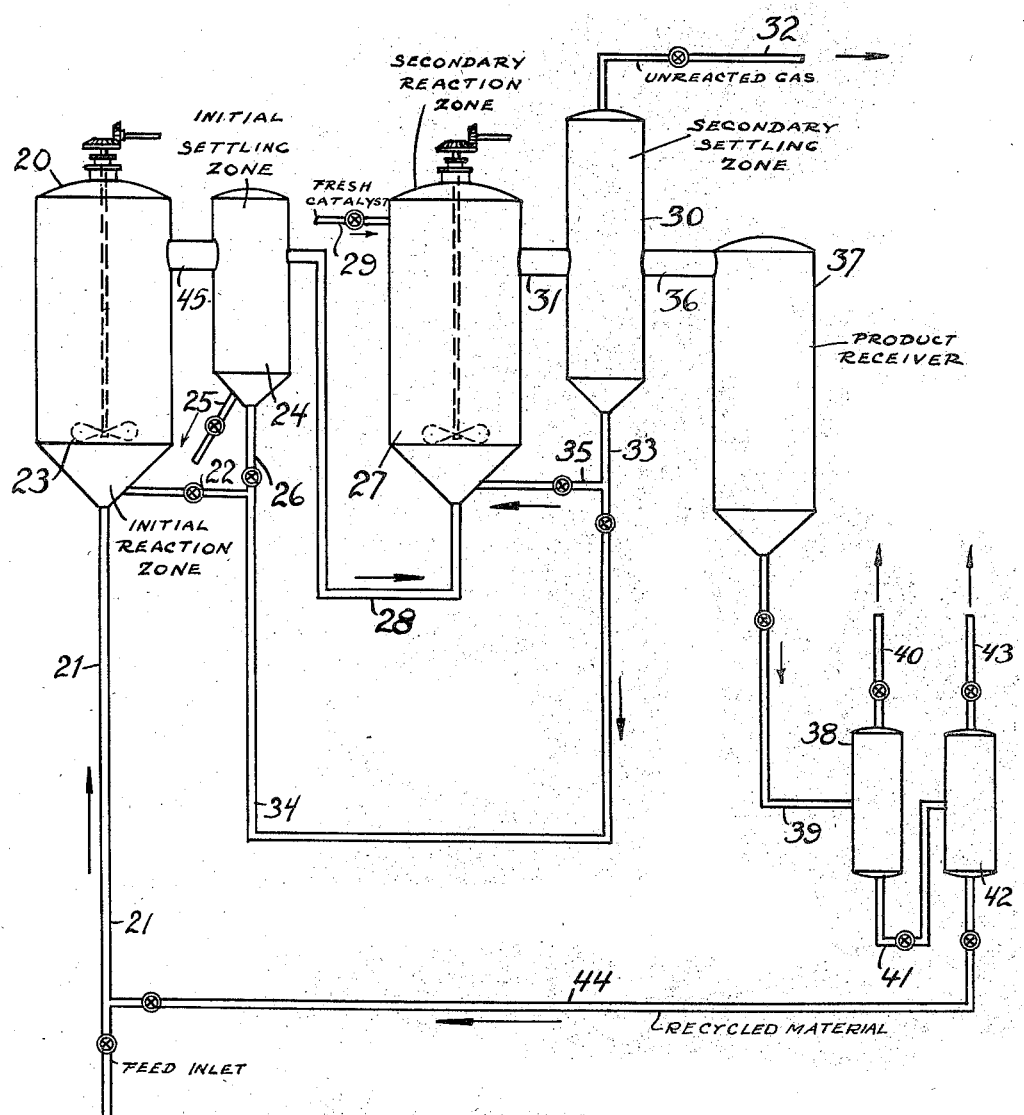

Referring specifically to Figure 2 it is assumed that the feed material comprises ethylene and benzene and that it is desired to produce a mono-ethyl benzene. The feed constituents are introduced into initial reaction zone 20 by means of line 21 while the catalyst is introduced by means of line 22. Adequate contact between catalyst and the feed is secured by means of stirrer or equivalent means 23. For the purpose of description it is assumed that reaction zone 20 is operated at a temperature of about 160° F. The reaction products together with the catalyst overflow from zone 20 by means of conduit 45 to initial settling zone 24. The catalyst separates in zone 24 and may be withdrawn from the system by means of line 25 or recycled to zone 20 by means of lines 22 and 26.

The partially reacted hydrocarbons flow from zone 24 and pass into secondary reaction zone 27 by means of line 28. Fresh catalyst is introduced into secondary reaction zone 27 by means of line 29. Temperature and pressure conditions are adjusted in zone 27 to secure substantially complete reaction of the ethylene. The reaction product together with the catalyst overflows into secondary settling zone 30 by means of line 31. Unreacted gases are removed from zone 30 by means of line 32 while the catalyst is removed by means of line 33. A portion of this catalyst is passed to zone 20 by means of line 34 while another portion is recycled to zone 27 by means of line 35. The alkylated product is removed from secondary settling zone 30 and passed to product receiving zone 37 by means of line 36.

This product is passed to distillation zone 38 by means of line 39 wherein unreacted benzene is removed by means of line 40 and preferably recycled to zone 20. The alkylated product is removed by means of line 41 and passed to distillation zone 42 wherein mono-ethyl benzene is separated and removed by means of line 43. The poly-ethyl benzenes are removed by means of line 44 and preferably recycled to zone 20.

The process of the present invention may be widely varied. The respective zones may comprise any suitable number and arrangement of units. The invention essentially comprises introducing feed material into the bottom of a reaction zone in which zone a body of the catalyst is maintained. The fresh catalyst is introduced at the top of the reaction zone and operating temperatures are adjusted so that the reaction products together with the catalyst overflow into a settling zone from which zone the catalyst is recycled to the bottom of the reaction zone. Although a single reaction and settling zone may be employed, a preferred adaptation of my invention comprises employing a plurality of zones. When operating in accordance with my process, it is possible to continuously alkylate aromatics as, for example, for the production of mono-ethyl benzene without incurring low yields and high catalyst consumption.

What I claim as new and wish to protect by Letters Patent is:

1. In a continuous process for alkylating aromatics to produce mono-alkyl compounds, in which process there is a tendency for poly-alkyl compounds to form, the improvement which comprises passing a feed material containing aromatic and olefinic hydrocarbons into the lower part of a reaction zone in which a body of catalyst is maintained, substantially continuously introducing fresh catalyst into the upper part of said zone wherein it contacts the feed material, passing mixed reaction products and catalyst from the upper part of said zone into a settling zone wherein the reaction products and catalyst separate, removing the reaction products and recycling at least a portion of the separated catalyst and such poly-alkyl compounds as may be formed to the lower part of said reaction zone.

2. Process according to claim 1, in which the aromatic and olefinic hydrocarbons are brought into the lower part of the reaction zone through a single inlet.

3. Process as defined by claim 1 in which said aromatic hydrocarbons comprise benzene, in which said olefinic hydrocarbons comprise ethylene and in which said catalyst comprises aluminum chloride.

4. Process for the continuous alkylation of aromatic hydrocarbons to produce predominantly mono-alkyl compounds, which comprises introducing a feed containing aromatic hydrocarbons and olefinic hydrocarbons into the bottom of an initial reaction zone, maintaining a body of catalyst within the bottom of said reaction zone, overflowing the reaction products and catalyst into an initial settling zone, separating catalyst, withdrawing a portion of the same from the system and recycling the remainder to the bottom of said reaction zone, separating the reaction products from said initial settling zone and passing the same into the bottom of a secondary reaction zone in which a body of catalyst is maintained in the bottom of said zone, substantially continuously introducing fresh catalyst into the top of said secondary reaction zone, overflowing the reaction products and catalyst into a secondary settling zone wherein the reaction products and catalyst separate, separating the reaction products and recovering the desired reaction products therefrom, removing the catalyst separated in said secondary settling zone, returning a portion of the same to said secondary reaction zone, and passing the remainder to said initial reaction zone.

5. Process as defined by claim 4 in which said aromatic hydrocarbons comprise benzene, in which said olefins comprise ethylene, and in which said catalyst comprises aluminum chloride.

CHARLES N. KIMBERLIN, Jr.